US012759083B2

(12) United States Patent
Pacher et al.

(10) Patent No.: US 12,759,083 B2
(45) Date of Patent: Oct. 13, 2026

(54) LASER TREATMENT METHOD

(71) Applicant: ADIGE S.P.A., Levico Terme (IT)

(72) Inventors: Matteo Pacher, Scurelle (IT); Mara Tanelli, Lodi (IT); Silvia Strada, Marciana Marina (IT); Barbara Previtali, Milan (IT); Sergio Matteo Savaresi, Cremona (IT); Maurizio Sbetti, Levico Terme (IT)

(73) Assignee: ADIGE S.P.A. (IT)

( * ) Notice: Subject to any disclaimer, the term of this patent is extended or adjusted under 35 U.S.C. 154(b) by 309 days.

(21) Appl. No.: 17/126,681

(22) Filed: Dec. 18, 2020

(65) Prior Publication Data

US 2021/0213567 A1 Jul. 15, 2021

(30) Foreign Application Priority Data

Dec. 20, 2019 (IT) ........................ 102019000025093

(51) Int. Cl.
*B23K 26/38* (2014.01)
*B23K 26/03* (2006.01)
(Continued)

(52) U.S. Cl.
CPC ............ *B23K 26/38* (2013.01); *B23K 26/032* (2013.01); *G05B 13/042* (2013.01);
(Continued)

(58) Field of Classification Search
CPC .... B23K 26/38; B23K 26/032; G05B 13/042; G06T 7/0004; G06T 2207/10016;
(Continued)

(56) References Cited

U.S. PATENT DOCUMENTS 6,311,099 B1 * 10/2001 Jasper .................... B23K 26/04 706/900
10,675,709 B2 6/2020 Ludi et al.
(Continued)

FOREIGN PATENT DOCUMENTS

CN 107803585 A * 3/2018 ............. B23K 26/00
DE 102012216928 A1 3/2014
(Continued)

OTHER PUBLICATIONS

CN-107803585-A (Keiichi, Nakanishi) Mar. 16, 2018 [retrieved on Sep. 4, 2025]. Retrieved from Espacenet Database, translation by EPO and Google. (Year: 2018).*
(Continued)

*Primary Examiner* — Woody A Lee, Jr.
*Assistant Examiner* — Franklin Jefferson Wang
(74) *Attorney, Agent, or Firm* — The Belles Group, P.C.

(57) ABSTRACT

A laser treatment method of a metallic work piece comprising of at least a) directing a laser beam onto the work piece at a working zone of the working piece to execute a cutting and/or piercing; b) executing a relative movement between the laser beam and the work piece at a determined velocity; c) acquiring a plurality of acquired images of the working zone; d) determining a time course of at least one characteristic parameter from the acquired images; e) calculating at least one statistical parameter from the time course of the characteristic parameter; f) establishing a quality value from the statistical parameter; and g) controlling one or more process parameters, in particular at least an intensity, laser frequency, and/or position of the focus of the laser beam; the determined velocity; a gas jet; and/or a gas pressure of the gas jet, in function of the quality value.

19 Claims, 2 Drawing Sheets

(51) Int. Cl.
*G05B 13/04* (2006.01)
*G06T 7/00* (2017.01)

(52) U.S. Cl.
CPC .. *G06T 7/0004* (2013.01); *G06T 2207/10016* (2013.01); *G06T 2207/20076* (2013.01); *G06T 2207/30136* (2013.01); *G06T 2207/30164* (2013.01); *G06T 2207/30168* (2013.01)

(58) Field of Classification Search
CPC . G06T 2207/20076; G06T 2207/30136; G06T 2207/30164; G06T 2207/30168
See application file for complete search history.

(56) References Cited

U.S. PATENT DOCUMENTS

| | | | | |
|---|---|---|---|---|
| 11,167,377 | B2 * | 11/2021 | Mochizuki | B23K 26/705 |
| 2009/0050612 | A1 * | 2/2009 | Serruys | B23K 26/032 219/121.83 |
| 2011/0192825 | A1 * | 8/2011 | Calefati | B23K 31/12 219/121.64 |
| 2011/0278277 | A1 * | 11/2011 | Stork Genannt Wersborg | B23K 26/02 219/209 |
| 2014/0175071 | A1 * | 6/2014 | Pfitzner | B23K 26/32 348/90 |
| 2016/0193692 | A1 * | 7/2016 | Regaard | B23K 31/125 219/121.62 |
| 2017/0355635 | A1 * | 12/2017 | Li | B23K 26/402 |
| 2018/0326534 | A1 * | 11/2018 | Hesse | B23K 31/125 |
| 2019/0240785 | A1 * | 8/2019 | Magg | B23K 26/0626 |
| 2021/0162544 | A1 * | 6/2021 | Fujii | B23K 26/064 |
| 2021/0387280 | A1 * | 12/2021 | Kessler | B23K 26/032 |
| 2022/0143704 | A1 * | 5/2022 | Tran | B23K 26/082 |

FOREIGN PATENT DOCUMENTS

| | | | |
|---|---|---|---|
| EP | 1886757 | | 2/2008 |
| EP | 2357057 | | 8/2011 |
| EP | 3159093 | | 4/2017 |
| JP | 2011183455 | A | 9/2011 |
| KR | 20050108702 | B1 * | 11/2005 |
| KR | 20160009132 | A | 1/2016 |

OTHER PUBLICATIONS

Office Action issued in counterpart Japanese Application No. 2020-210370 on Aug. 2, 2024.
Office Action issued in counterpart Chinese Application No. 202011504763.1 on May 25, 2024.

* cited by examiner

LASER TREATMENT METHOD

CROSS-REFERENCE TO RELATED APPLICATIONS

This patent application claims priority from Italian patent application no. 102019000025093 filed on Dec. 20, 2019, the entire disclosure of which is incorporated herein by reference.

TECHNICAL FIELD

The present invention relates to a laser treatment method for cutting and/or piercing a work piece. In particular, the present invention relates to a laser treatment method in continuous mode and with a closed-loop control of the quality of a cutting or piercing during a cutting or piercing step, and still more in particular a treatment process control to ensure a predetermined treatment quality.

The present invention also relates to a laser treatment machine configured to execute a laser method for cutting and/or piercing a work piece. In particular, the present invention relates to a laser treatment machine configured to execute a laser treatment method in continuous mode and with closed-loop control of the cutting or piercing quality during a cutting or piercing step, and still more in particular a closed-loop control of the treatment to ensure a predetermined treatment quality.

BACKGROUND OF THE INVENTION

Laser treatment machines are known for cutting and/or piercing work pieces. A typical laser treatment machine comprises an emission source of a laser beam, a support for the work piece, an optical group to control the focus position of the laser beam, a generating device configured to create a gas jet for directing compounds created during the processing of the work piece away from the work piece itself and a movement device to execute a relative movement between the laser beam and the work piece.

In use, the qualitative result of cutting or piercing the work piece depends for example on the intensity of the laser beam, the pressure of the gas jet or the velocity of the relative movement between the laser beam and the work piece.

For example, the formation of a dross at the lower edge of the cut or pierced portion of the work piece is known.

In theory it is conceivable to set the respective parameters in such a way so as to obtain the maximum achievable quality, for example the absence of dross. However, to obtain such a result it is necessary to control the processing parameters such that a reduction in productivity is caused at the same time.

Consequently, it is necessary to obtain, for example through simulations or practical estimates or through measurements, information to optimize the parameters in such a way so as to maximize processing productivity while thereby guaranteeing the treatment quality. It should be noted that the optimization of the parameters results in the determination of a set of optimized parameters which, however, are static, i.e. they are not changed during the treatment of the work piece. This means that in some circumstances, this set of optimized parameters results in a not optimal treatment either in terms of productivity or quality.

It should be noted that treatment machines equipped with means which are able to obtain from the analysis of some process measurements a rough estimate of the dross that is created during cutting and/or piercing are known. In particular, these estimates are generally at discrete thresholds and categorize the dross, for example, as “absent” or “present”, but are unable to estimate a continuous value that represents the dross that is actually present on the cut piece. In addition to this, in the absence of a control, in particular a closed-loop control, the tendency is to carry out an empirical calibration of the process parameters that guarantee the absence of dross, which leads to a non-optimal working condition in terms of productivity.

In this context, for example, the use of photodiodes to monitor the progressing of the treatment is known.

However, for example, the use of photodiodes does not allow to obtain reliable information on the formation of the dross.

Therefore, in the sector the need is felt to further improve the laser treatment methods and/or the laser treatment machines to cut and/or pierce the work pieces with the possibility of monitoring and regulating, in particular in continuous mode and online, still more in particular, a continuous estimated variable obtained online, the treatment quality.

SUMMARY OF THE INVENTION

The purpose of the present invention is the realization of a laser treatment method for cutting and/or piercing and a laser treatment machine which allows, in a simple and economical way, to overcome at least one of the aforementioned drawbacks.

In particular, the purpose of the present invention is the realization of a laser treatment method for cutting and/or piercing and a laser treatment machine that permits a quality control and the control of the process parameters of the machine in function of the quality obtained.

The above objects are achieved by the present invention, since it relates to a laser treatment method as defined in the independent claim. Alternative preferred embodiments are protected in the respective dependent claims.

The above objects are also achieved by the present invention since it relates to a laser treatment machine according to claim 14.

BRIEF DESCRIPTION OF THE DRAWINGS

Further features and advantages of the present invention will become apparent from the detailed description that follows, provided by way of non-limiting example with reference to the accompanying drawings, wherein.

DETAILED DESCRIPTION OF THE INVENTION

Figure 1:
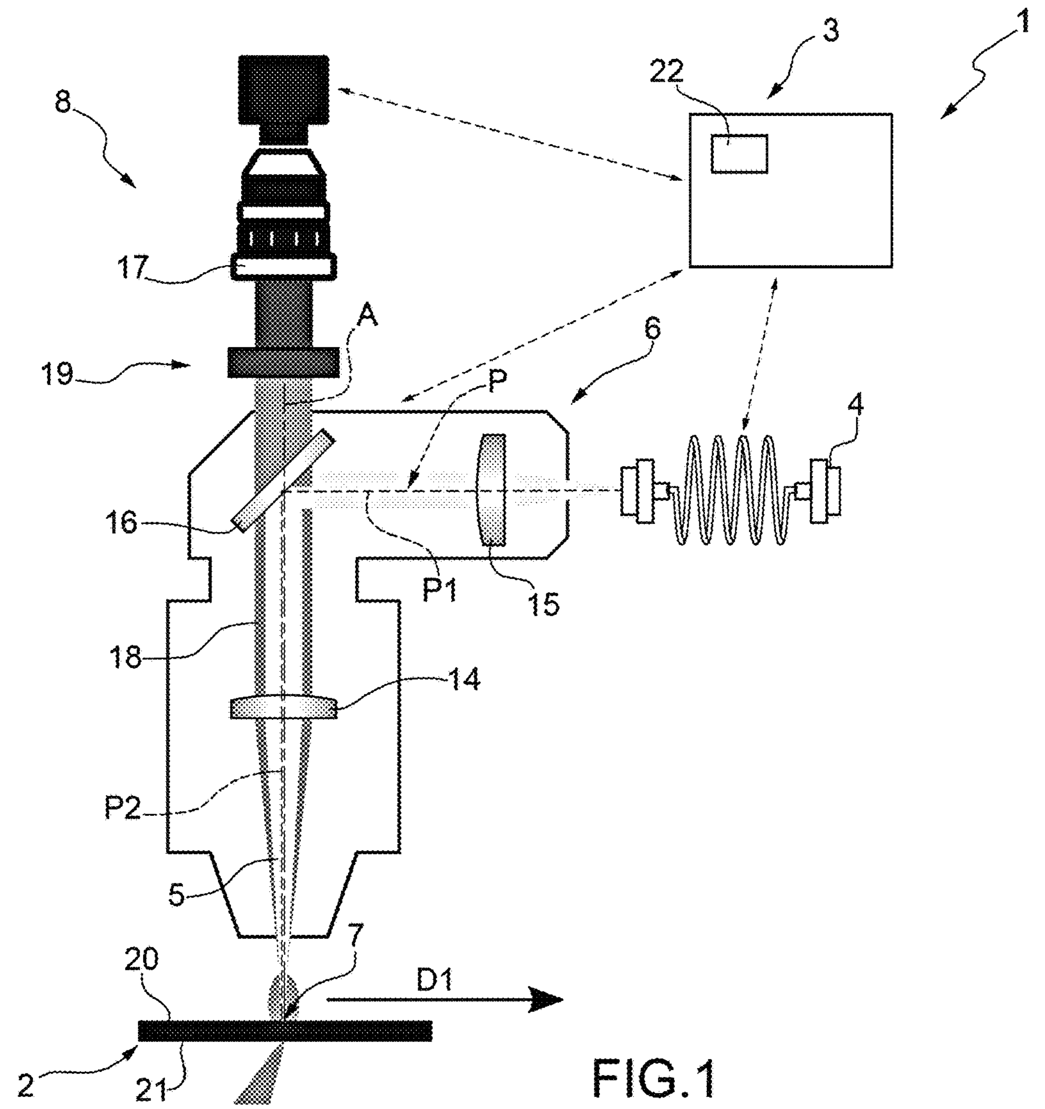
FIG. 1 illustrates in a schematic and partial way a laser treatment machine according to the present invention.

In FIG. 1, 1 generally indicates, as a whole, a laser treatment machine configured to cut and/or pierce a work piece 2. Preferentially, the work piece 2 is made of a metallic material. In particular, the work piece 2 has a planar and/or tubular shape.

In more detail, the laser treatment machine 1 comprises: a control unit 3 for controlling the actuation of the laser treatment machine 1; an emission source 4 of a laser beam 5 operatively connected to the control unit 3 and configured to emit the laser beam 5; an optical group 6 (operatively connected to the control unit 3) for controlling the laser beam 5, in particular for directing the laser beam 5 along an optical axis A onto the work piece 2 and at a working zone 7; and a movement device operatively connected to the control unit 3 and configured to execute a relative movement between the laser beam 5 and the work piece 2 at a determined velocity, in particular, to define the cutting and/or piercing shape.

In particular, it should be noted that the working zone 7 is the zone of the work piece 2 which is exposed, in use, to the laser beam 5 and which is consequently cut and/or pierced. It is dynamic in use due to the relative movement between the laser beam 5 and the work piece 2.

Preferentially, the laser treatment machine 1 also comprises: a generating device (not illustrated and known per se) operatively connected to the control unit 3 and configured to create a gas jet to direct compounds created during cutting and/or piercing of the work piece 2 away from the work piece 2.

According to some preferred non-limiting embodiments, the control unit 3 is configured to control process parameters of the laser treatment machine 1, in particular an intensity of the laser beam 5 and/or a laser frequency of the laser beam 5 and/or a focus position of the laser beam 5 and/or a determined velocity of the relative movement between the laser beam 5 and the work piece 2 and/or the gas jet and/or a gas pressure of the gas jet.

Preferentially, the control unit 3 is configured to control the process parameters in feedback mode.

It should be noted that the process parameters are (substantially) all the parameters that define the actuation of the laser treatment machine 1.

Figures 2A, 2B, 2C:
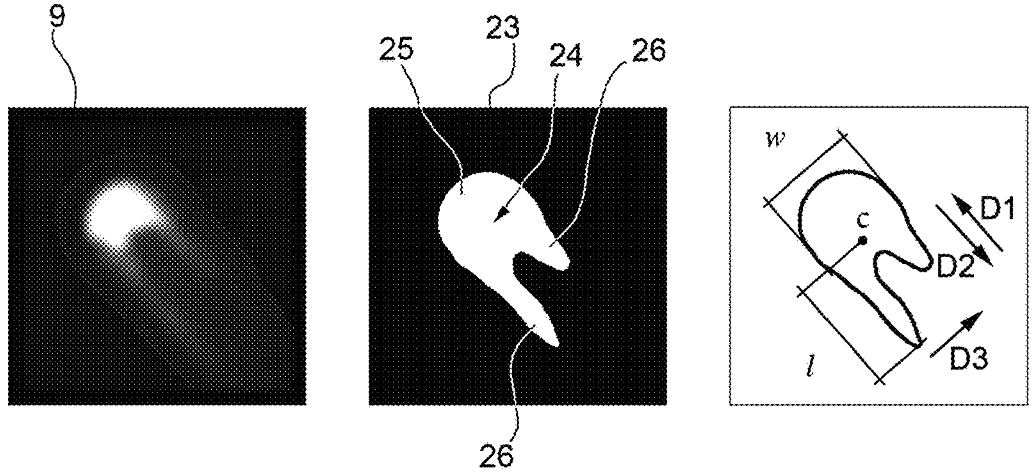
FIG. 2*a* illustrates an example of an acquired image obtained during the actuation of the treatment machine of FIG. 1.
FIGS. 2*b* and 2*c* illustrate steps of analysis of the control image of FIG. 2*a;*

Advantageously, the laser treatment machine 1 also comprises a monitoring device 8 configured to monitor the treatment process, in particular the cutting and/or piercing. In particular, the monitoring device 8 is configured to acquire a plurality of acquired images 9 (an exemplary acquired image is illustrated in FIG. 2*a*) of the working zone 7.

In particular, the monitoring device 8 is operatively connected to the control unit 3, which is configured to control the actuation of the laser treatment machine 1 at least in function of information extracted and/or obtained from the acquired images 9.

In particular, the monitoring device 8 is configured to acquire the images acquired 9 during the actuation of the laser treatment machine 1 (in other words, the monitoring device 8 is configured to operate in an online mode).

According to some preferred non-limiting embodiments, the monitoring device 8 is configured to acquire the process emission, i.e. thermal emission of heat present at the working zone 7. Preferentially, the emission source 4 comprises an ND:YAG laser, in particular of the fiber type or a carbon dioxide laser.

In greater detail, the optical group 6 is configured to direct the laser beam 5 onto the work piece 2 and to determine the focus of the laser beam 5.

Preferentially, the optical group 6 is configured to define an optical path P from the emission source 4 onto the work piece 2, which comprises a first transverse portion P1, in particular perpendicular to the optical axis A, and a second portion P2 coaxial to the optical axis A. In other words, the laser beam 5 propagates along the portion P1 and the portion P2 respectively, in which P1 is perpendicular to P2, in which preferentially the portion P2 coincides with the optical axis A.

Preferentially, the optical group 6 comprises at least one focusing lens 14 configured to determine the focus of the laser beam 5, in particular the focusing lens 14 is arranged in the portion P2.

Still more particularly, the optical group 6 also comprises a collimation lens 15 and a dichroic mirror 16 configured to deflect the laser beam 5 from the portion P1 to the portion P2. In particular, the collimating lens 15 is arranged in the portion P1.

Preferentially, the dichroic mirror 16 is arranged in such a way that the laser beam 5 is deflected from a propagation along the first portion P1 to a propagation along the second portion P2.

In greater detail, the movement device is configured to control a movement of the laser beam 5 relative to the work piece 2 in a direction of relative advancement D1.

Preferentially, the movement device comprises a support (not illustrated and known per se) configured to support the work piece 2, in particular the support is movable to be set in motion to obtain the relative movement between the laser beam 5 and the work piece 2.

Alternatively or in addition, at least a portion of the movement device is integrated in and/or associated with the support to move the work piece 2 to obtain a relative movement between the laser beam 5 and the work piece 2.

Alternatively or in addition, the movement device comprises a movable support base carrying the emission source 4 and/or the optical group 6 and/or a portion of the optical group 6 for moving the laser beam 5.

In greater detail, the monitoring device 8 comprises at least one video camera 17, for example of the CCD or CMOS type, configured to acquire the acquired images 9. In particular, the video camera 17 is configured to continuously acquire the acquired images 9 so as to obtain a temporal sequence of the acquired images 9. Even more particular, the video camera 17 is configured to acquire the acquired images 9 at a frequency of at least 1000 frames per second, in particular at least 1500 frames per second.

In particular, the video camera 17 is configured to acquire a light beam 18 originating from the working zone 7, which light beam 18 propagates, in use, in a third direction (opposite to the second direction P2).

Still more particularly, the light beam 18 corresponds to the process emissions at the working zone 7.

Preferentially, the light beam 18 passes through at least a portion of the optical group 6, in particular the focusing lens 14 and the dichroic mirror 16.

Preferentially, the video camera 17 is arranged coaxial to the optical axis A. In particular, the light beam 18 propagates parallel to the portion P2.

In greater detail, the monitoring device 8 also comprises an optical filtering group 19 configured to ensure that the video camera 17 receives light in a band of defined wavelengths. In particular, the optical filtering group 19 operates in the near infrared (it is a near infrared filter).

In particular, the optical filtering group 19 is arranged upstream of the video camera 17 relative to the third direction.

In particular, the optical filtering group 19 comprises a low band filter (for example at 750 nm) and a low pass filter (for example at 1000 nm).

It should be noted that during the actuation of the laser treatment machine 1, the laser beam 5 cuts, in particular by heating, the material from the work piece 2 at the working zone 7, creating a slot that extends along the entire thickness of the work piece 2. In particular, the laser beam 5 cuts the work piece 2 from a first surface 20 of the work piece 2 to a second surface 21 of the work piece 2 opposite the first surface 20. Even more particular, a first edge of the slot at the surface 20 and a second edge of the slot opposite the first edge at the surface 21 are formed.

It is also known that the gas jet should remove and/or move away the compounds that are created during the cutting and/or piercing of the work piece 2 at the working zone 7 before their cooling.

Furthermore, it is known that dross may form at the second edge during the processing of the work piece 2. In particular, this occurs because the material removed by the laser beam 5 cools and consequently stops before being removed from the work piece 2, thus creating dross.

In particular, the creation of the dross occurs in function of one or more process parameters, such as the intensity of the laser beam 5 and/or the laser frequency of the laser beam 5 and/or the position of the focus of the laser beam 5 and/or the determined velocity of the relative movement between the laser beam 5 and the work piece 2 and/or the gas jet and/or the gas pressure of the gas jet.

The control of the process parameters usually takes place in such a way that dross formation is substantially suppressed. This, however, results in a decrease in productivity, possibly also causing an increase in costs.

The Applicant has realized that dross formation does not necessarily have to be suppressed, but that the tolerable presence and quantity thereof depend on the specific application.

For this reason and as described below, first of all, the laser treatment machine 1 is equipped with means for controlling the cutting and/or piercing quality and/or the presence and quantity of dross (in quantitative and continuous terms both over time and quantity of the dross produced).

Advantageously, the control unit 3 is configured to determine a quality value from the acquired images 9, in particular from the analysis of the acquired images 9.

In particular, the quality value is indicative of the quality of the cutting and/or piercing. Even more particular, the quality value describes the presence and/or quantity of dross formed at the working zone 7.

According to some preferred non-limiting embodiments, the control unit 3 is configured to determine the quality value during the actuation of the laser treatment machine 1 in a continuous way, in particular both in time and in quantity of dross produced. In this way, a control of the cutting and/or piercing quality is guaranteed during the entire actuation of the laser treatment machine 1.

Preferentially, the control unit 3 comprises an analysis unit 22 configured to analyze and/or to determine the quality value from the acquired images 9.

In particular, the analysis group 22 is configured to determine at least one characteristic parameter (see FIG. 2*c*), preferentially a plurality of characteristic parameters, from each acquired image 9.

Figure 3:
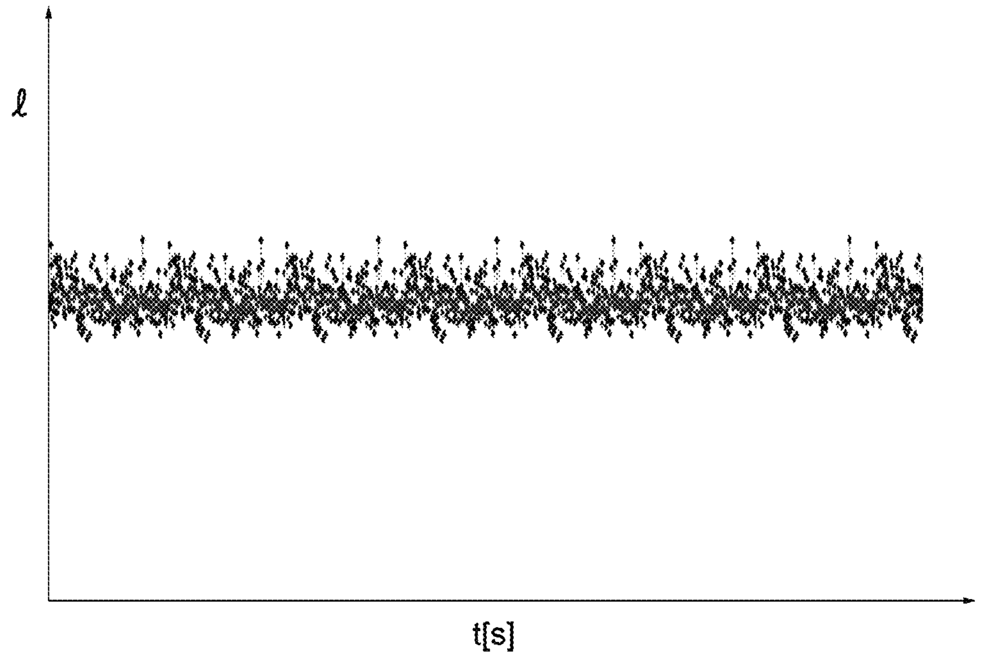
FIG. 3 illustrates a time course of a characteristic parameter obtained from the analysis of a plurality of acquired images.

Considering the fact that the acquired images 9 are determined at different temporal moments, the analysis group 22 is also configured to determine a respective time course (see for example FIG. 3) of the characteristic parameter or parameters of the acquired images 9.

Preferentially, the analysis group 22 is also configured to calculate at least one statistical parameter, preferentially a plurality of statistical parameters, from the respective time courses of the characteristic parameter or the characteristic parameters and to establish a quality value starting from the statistical parameter or the statistical parameters. In particular, each time course is considered for a defined time, in particular this defined time being constant.

In greater detail, the analysis group 22 is configured to transform each acquired image 9 (independently of the others) into a transformed image 23 (see FIG. 2*b*), in particular by means of a segmentation, to obtain a respective binary image.

Preferentially, each transformed image 23 (binary image) comprises a first color (for example white) and a second color (for example black).

It should be considered that each acquired image 9 features information on the intensity of the process emissions. In particular, the first color and the second color are associated with the respective zones of each transformed image 23, which correspond to respective zones of the respective transformed image 23, which have intensities respectively equal to or greater than a determined intensity threshold.

According to some preferred embodiments, each acquired image 9 and consequently the respective transformed images 23 comprise a respective high-intensity zone 24 having in turn a respective main portion 25, in particular approximable and/or describable through a circular shape, and one or more respective elongated portions 26 extending from the respective main portion 25, in particular extending in a direction D2 parallel to the direction of relative advancement D1. In particular, each high-intensity zone 24 (and consequently also the respective main portions 25 and the respective elongated portions 26) is defined by the zones of the respective acquired image 9, which have intensities that are greater than or equal to the determined intensity threshold.

With particular reference to FIG. 2*c*, each characteristic parameter is defined by or in function of a width w and/or a length 1 and/or an intensity of the respective high-intensity zone 24, in particular of the respective main portion 24 and of the respective elongated portions 26.

In particular, the analysis group 22 is configured to determine the respective width w and/or the respective length 1 and/or the respective intensity from each acquired image 9 and/or from each transformed image 23, preferentially from each transformed image 23.

In particular, the respective width w of each high-intensity zone 24 is defined by a maximal extension of the high-intensity zone 24 in a direction D3 perpendicular to the direction of relative advancement D1.

More particular, the maximal extension in the direction D3 corresponds to a maximal extension of the respective main portion 24 in the direction D3.

In particular, the respective length 1 of each high-intensity zone 24 is defined as a maximal extension of the high-intensity zone 24 in the direction D2 from a center of gravity c of the high-intensity zone 24. In particular, the respective length 1 corresponds to a maximal extension of the respective elongated portion 26 that is the farthest from the center of gravity c.

It should be noted that each characteristic parameter can be defined not only by the respective length 1, by the respective width w or by the respective intensity, but also by the combinations thereof and/or the respective time derivatives thereof.

In greater detail, the analysis group 22 is also configured to determine a respective probabilistic distribution (see FIG. 4) from the respective time course of each characteristic parameter and to determine the statistical parameter(s) from the respective probabilistic distribution. In particular, the respective statistical parameters are chosen in the group consisting of a respective medium value, a respective variance and a respective skewness of the probabilistic distribution.

Figure 4:
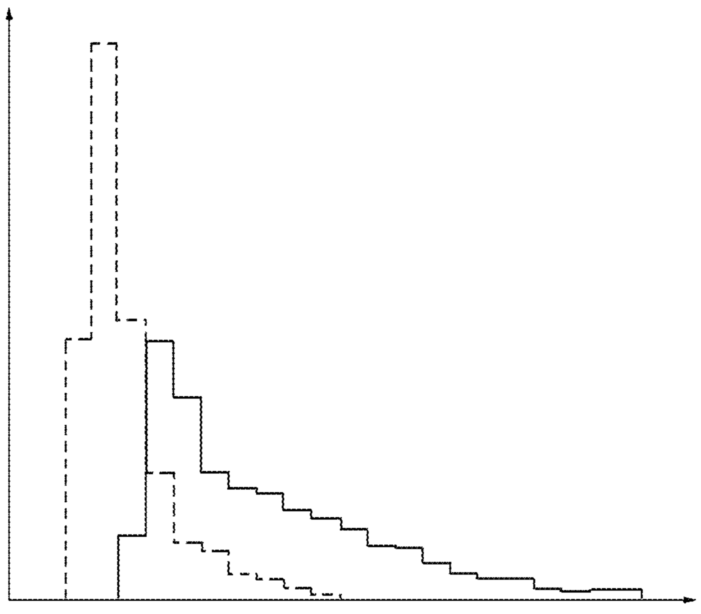
FIG. 4 illustrates distributions of the characteristic parameter obtained from the respective time courses of the characteristic parameter during the actuation of the treatment machine of FIG. 1 in two different conditions.

In particular, FIG. 4 shows two examples of probabilistic distributions determined during the cutting of the respective work pieces 2. The dashed probabilistic distribution results from a laser cut with a higher quality than the probabilistic distribution drawn with a solid line.

It is clear that the difference that the illustrated probabilistic distributions show can be described by respective medium values, respective variances and respective different skewnesses.

In greater detail, the analysis group 22 is configured to determine the quality value from the statistical parameter(s) from a non-linear or a linear function, in particular from a non-linear function. Preferentially, the non-linear function is approximated by a neural network, which receives, in use, the statistical parameter(s) to determine the quality value.

Preferentially, the analysis group 22 is configured to operate in continuous mode, in particular both in time and in quantity, in such a way as to determine a time course of the quality value. In particular, the analysis group 22 is configured in such a way that for the determination of each quality value a plurality of acquired images 9 acquired in succession between them and during the defined time are analyzed. Still more particularly, the analysis group 22 is configured to analyze a first plurality of acquired images 9 and a second plurality of acquired images 9 to determine respectively a first quality value and a second quality value subsequent to the first quality value; and at least the first plurality of acquired images 9 and the second plurality of acquired images 9 partially overlap.

Preferentially, the second plurality of acquired images 9 comprises the same number of acquired images 9 as the first plurality of acquired images 9. The second plurality of acquired images 9 comprises a defined number of additional acquired images 9, which have been acquired (relative to the time course) after the acquired images 9 of the first plurality of acquired images 9 (in other words, the defined number of acquired images 9 follow with regards to the time course the last acquired image 9 of the first plurality of acquired images 9). Furthermore, the second plurality of acquired images 9 does not comprise a number identical to the defined number of the acquired images 9 of the first plurality of acquired images 9, which were acquired before the others (i.e. the oldest acquired images 9 of the first plurality of acquired images 9 are not included in the second plurality of acquired images 9). In particular, the defined number is equal to or greater than 1.

In other words, the first plurality of acquired images 9 and the second plurality of acquired images 9 cover an identical time span, in particular equal to the defined time. While the sequence of the first plurality of acquired images 9 comprises acquired images 9, which were acquired before all the others, the second plurality of acquired images 9 comprises a sequence of acquired images 9 of which at least one acquired image 9 was acquired after all the others of the first plurality.

In greater detail, the control unit 3 is also configured to receive and/or allow the definition of a desired quality value, for example by means of a man-machine interface of the laser treatment machine 1. The desired quality value is indicative of the desired cutting and/or piercing quality. For example, the desired quality value is indicative of the presence and/or quantity of dross. In particular, the desired quality value describes the tolerable quantity of dross.

Preferentially, the control unit 3 is configured to control the process parameters in function of the determined value (s) of quality and the desired quality value, in particular to obtain in the continuation of the cutting and/or piercing a quality value which is (substantially) identical to the desired quality value.

It should be noted that in the context of this description, the term "quality value" describes a quality level obtained.

It should also be noted that in the context of the present description, the term "desired quality value" indicates that the desired quality value can be chosen and/or controlled, for example by an operator. The desired quality value can also be chosen to obtain a cutting and/or piercing of the highest quality (for example to minimize or even avoid the formation of dross), however, the laser treatment machine 1 and the actuation thereof allow for a control and/or an arbitrary choice of the desired quality value.

In particular, the desired quality value describes the desired quality level, i.e. the quality level to be obtained by cutting and/or piercing.

In use, the laser treatment machine 1 cuts and/or pierces the work piece 2.

In particular, the actuation of the laser treatment machine 1 comprises at least the following steps: a) directing the laser beam 5 onto the work piece 2 at the working zone 7 of the working piece 2 in order to execute the cutting and/or piercing; b) executing the relative movement between the laser beam 5 and the work piece 2 at a determined velocity, in particular to define the shape of the cutting and/or piercing; c) acquiring a plurality of acquired images 9 of the working zone 7; d) determining the time course of one or more characteristic parameters from the acquired images 9; e) calculating at least one respective statistical parameter from the time course of each characteristic parameter; f) establishing a quality value from the statistical parameter(s); and g) controlling, in particular in feedback, one or more process parameters (of the laser treatment machine 1), such as for example an intensity of the laser beam 5, a laser frequency of the laser beam 5, a position of the focus of the laser beam 5, a determined velocity of the relative movement between the laser beam 5 and the work piece 2, the gas jet or a gas pressure of the gas jet, in function of the quality value.

Preferentially, the actuation of the laser treatment machine 1 comprises one or more repetition steps during which at least steps c)-f), preferentially steps a)-f) are repeated.

Preferentially, steps c)-g) are carried out during steps a) and b).

In greater detail, during the step of directing the laser beam 5 onto the work piece 2, the emission source 4 emits the laser beam 5 and the optical unit 6 directs the laser beam 5 onto the work piece 2. In particular, the control unit 2 controls by means of a control of the optical group 6, in particular, the focusing lens, the focus of the laser beam 5.

Preferentially, during step b), the work piece 2 and/or the laser beam 5 is moved. In particular, during step b), the support carrying the work piece 2 and/or the support base carrying the emission source 4 and/or the optical group 6 is or are moved. More preferentially, only the support is handled to move only the work piece 2.

Preferentially, during step b), a relative movement is also executed between the monitoring device 8 and the work piece 2. In particular, no relative movement is executed between the laser beam 5 and the monitoring device 8.

It should be noted that due to the relative movement between the laser beam 5 and the work piece 2 the working zone 7 also varies with respect to the work piece 2 over time.

In greater detail, during step c), the acquired images 9 are determined by the monitoring device 8, in particular, by the video camera 17.

In particular, during step c), the video camera 17 acquires the process emissions (i.e. heat).

In particular, during step c), each acquired image 9 is acquired at a time different from the others. Consequently, each acquired image 9 also corresponds to a different working zone 7.

Preferentially, during step c), the acquired images 9 are acquired, in particular by the monitoring device 8, still more particularly by the video camera 17, at a frequency of at least 1000 frames per second, in particular at least 1500 frames per second.

In greater detail, during step d), the time course of each characteristic parameter is determined for a defined time, in particular defined and constant (in other words, the number of acquired images 9 that are used to determine each characteristic parameter is constant and predefined).

Preferentially, during step d), a transformation sub-step is performed, during which each acquired image 9 is transformed into a respective transformed image 23. After that, each characteristic parameter is obtained from the transformed image 23.

In particular, the transformation step is a thresholding sub-phase during which each acquired image 9 is segmented in order to obtain a respective binary image (transformed image 23).

In particular and with particular reference to FIG. 2*b*, during the thresholding sub-phase the first color (for example white) is associated with the respective zones of each transformed image 23 (binary image), which correspond to respective zones of the respective acquired image 9, which have intensities that are respectively equal to or greater than the determined intensity threshold and the second color (for example black) (binary image) is associated to respective zones of the respective acquired image 9 that have intensities that are respectively below the determined intensity threshold.

In particular, during the thresholding sub-phase, each pixel of the respective acquired image 9 is associated with the first color or the second color to obtain the respective transformed image 23 on the basis of the determined intensity threshold. The first color is associated with the pixels having an intensity equal to or greater than the determined intensity threshold and the second color is associated with the pixels having an intensity lower than the determined intensity threshold.

Preferentially, during step d), each transformed image 23 (binary image) is analyzed to determine one or more characteristic parameters defined by or in function of the width and/or the length and/or intensity of the high-intensity zone 24.

In particular, during step d), the respective width w of each high-intensity zone 24 is determined by the maximal extension of the high-intensity zone 24, in particular of the respective main portion 25, in the direction D3.

In particular, during step d), the respective length 1 of each high-intensity zone 24 is determined by the maximum extension of the high-intensity zone 24, in particular of the elongated portions, in the direction D2 from the center of gravity c of the high-intensity zone 24.

In greater detail, during step e) a respective probabilistic distribution is determined (see FIG. 4) from the time course of each characteristic parameter and the statistical parameter (s) is or are determined by the respective probabilistic distribution. In particular, each statistical parameter is chosen in the group consisting of the respective medium value, the respective variance and the respective skewness of the respective probabilistic distribution.

In greater detail, during step f), the quality value is obtained from the statistical parameter(s) from a non-linear or a linear function, preferentially from a non-linear function.

In particular, the non-linear function is approximated by means of an artificial neural network, which receives one or more statistical parameters as parameters.

According to preferred non-limiting embodiments, the statistical parameter(s) and the quality value characterize a presence and/or formation and/or quantity of dross.

Preferentially, the actuation of the laser treatment machine 1 also includes a step of defining the desired quality value. This desired quality value defines the desired cutting and/or piercing quality. In particular, during this step the user is given the possibility to define the quality of the cutting and/or piercing that is sufficient for the specific purposes and to optimize the quality-price ratio.

In greater detail, during step g), the process parameters are checked in function of the determined quality value and the desired quality value.

Preferentially, during step g), the process parameter(s) are controlled in such a way as to obtain a quality value substantially equal to the desired quality value.

From an examination of the characteristics of the laser treatment machine 1 and of the actuation method thereof according to the present invention, the advantages it allows to be obtained are evident.

In particular, the laser treatment machine 1 and the actuation thereof allow continuous monitoring, in particular both in time and in quantity, of the cutting or piercing quality and to control the actuation in function of the quality, expressed in quantitative terms from a determined quality value.

A further advantage lies in the fact of using statistical parameters, which are obtained from a processing of time courses of characteristic parameters. This allows to obtain non-discrete information that can only be determined for a specific position and a specific temporal moment, but to obtain information that reflects a larger data set. In this way, the accuracy of the determination is increased.

Another advantage lies in the possibility to determine the desired quality value. In this way, an operator is given the possibility to optimize the quality-price ratio of the work piece 2.

Finally, it is clear that modifications and variations may be made to the laser treatment machine 1 and to the actuation method described and illustrated here, which do not depart from the scope of protection defined by the claims.

The invention claimed is:

1. A laser treatment method of a metallic work piece comprising at least the steps of:

a) directing a laser beam onto the work piece at a working zone of the working piece in order to execute a cutting and/or piercing;

b) executing a relative movement between the laser beam and the work piece at a determined velocity, the relative movement defining a direction of relative advancement, the direction of relative advancement being a direction of movement of the laser beam relative to the work piece;

c) acquiring a plurality of acquired images of the working zone;

d) determining, during which an analysis group determines respective time courses of a plurality of characteristic parameters from the acquired images e) calculating, during which the analysis group calculates at least one statistical parameter from the respective time course of each characteristic parameter;

f) establishing, during which the analysis group establishes a quality value from the statistical parameters, and g) controlling one or more process parameters, the one or more process parameters comprising at least one of: an intensity of the laser beam and/or a laser frequency of the laser beam and/or a position of the focus of the laser beam and/or the determined velocity and/or a gas jet and/or a gas pressure of the gas jet, in function of the quality value, wherein as part of element e), determining respective probabilistic distributions from the respective time courses of the characteristic parameters over a defined time that is constant, and determining the respective statistical parameters from the respective probabilistic distributions, wherein, for determining each quality value, the analysis group analyzes a plurality of acquired images acquired in succession during the defined time, and successive pluralities of acquired images cover the defined time and partially overlap by at least one acquired image, wherein during step d), a transformation sub-step is performed, during which each acquired image is transformed into a respective transformed image; the transformation step being a thresholding sub-phase during which each acquired image is segmented in order to obtain the respective transformed image corresponding to a binary image;

wherein during step d), each acquired transformed image is analyzed to determine the one or more characteristic parameters;

wherein each acquired transformed image comprises a high-intensity zone, wherein each high-intensity zone is defined by the zones of the respective acquired image, which have intensities that are greater than or equal to a determined intensity threshold;

wherein each characteristic parameter is obtained from the respective high intensity zones of the respective acquired images and at least one characteristic parameter is, or is a function of, a width of the high-intensity zone and at least one other characteristic parameter is, or is a function of, a length of the high-intensity zone;

wherein the respective width of each high-intensity zone is defined by a maximal extension of the respective high-intensity zone in a direction perpendicular to the direction of relative advancement;

wherein each high-intensity zone comprises a main portion and one or more elongated portions extending from the main portion; and wherein the length of each high-intensity zone is defined as a maximal extension of the high-intensity zone in the direction of relative advancement from a center of gravity of the high-intensity zone, the length corresponding to a maximal extension of an elongated portion of the high-intensity zone that is farthest from the center of gravity.

2. The method according to claim 1, further comprising at least one h) repeat step during which at least the steps c)-f) are repeated one or more times.

3. The method according to claim 1, wherein as part of element e), the statistical parameter is chosen from at least one of: a respective medium value, a respective variance, or a respective skewness of the probabilistic distribution.

4. The method according to claim 1, wherein the statistical parameter and the quality value characterize a presence and/or a formation and/or a quantity of dross.

5. The method according to claim 1, further comprising the step of defining a desired quality value;

wherein during the step of controlling, the process parameter or the process parameters are controlled as a function of the quality value and the desired quality value.

6. The method according to claim 5, wherein during the step g), the process parameter or the process parameters are controlled in a manner to obtain a quality value equal to the desired quality value.

7. The method according to claim 1, wherein each acquired image is a heat image.

8. The method according to claim 1, wherein during the step f), the quality value is obtained from the statistical parameter from a linear function or a non-linear function.

9. The method according to claim 1, wherein during the step c), the acquired images are acquired at a rate of at least 1000 frames per second.

10. The method according to claim 9, wherein during the step c), the acquired images are acquired at a rate of at least 1500 frames per second.

11. The method according to claim 1, further comprising at least one h) repeat step during which at least the steps a)-f) are repeated one or more times.

12. The laser treatment method according to claim 1, wherein as part of element c), the acquired images are acquired by a video camera, the video camera being disposed in a coaxial configuration with an optical axis along which the laser beam propagates.

13. The laser treatment method of claim 1, wherein the direction of relative advancement being a movement of the laser beam relative to the work piece.

14. A laser treatment machine configured to cut and/or pierce a work piece, the laser treatment machine comprising:

a control unit configured to control an actuation of the laser treatment machine;

an emission source of a laser beam operatively connected to the control unit and configured to emit the laser beam;

an optical group configured to control the laser beam; and a movement device operatively connected to the control unit and configured to execute a relative movement between the laser beam and the work piece at a determined velocity, the laser treatment machine being configured at least to:

a) direct a laser beam onto the work piece at a working zone of the working piece in order to execute a cutting and/or piercing;

b) execute a relative movement between the laser beam and the work piece at a determined velocity, the relative movement defining a direction of relative advancement, the direction of relative advancement being a direction of movement of the laser beam relative to the work piece;

c) acquire a plurality of acquired images of the working zone;

d) determine, by an analysis group respective time courses of a plurality of characteristic parameters from the acquired images;

e) calculate, by the analysis group, at least one statistical parameter from the respective time course of each characteristic parameter;

f) establish, by the analysis group, a quality value from the statistical parameters; and g) control one or more process parameters, the one or more process parameters comprising at least one of: an intensity of the laser beam and/or a laser frequency of the laser beam and/or a position of the focus of the laser beam and/or the determined velocity and/or a gas jet and/or a gas pressure of the gas jet, in function of the quality value, wherein as part of element e), the analysis group determines respective probabilistic distributions from the respective time courses of the characteristic parameters over a defined time that is constant, and determines the respective statistical parameters from the respective probabilistic distributions, wherein for determining each quality value, the analysis group analyzes a plurality of acquired images acquired in succession during the defined time, and successive pluralities of acquired images cover the defined time and partially overlap by at least one acquired image, wherein during step d), a transformation sub-step is performed, during which each acquired image is transformed into a respective transformed image; the transformation step being a thresholding sub-phase during which each acquired image is segmented in order to obtain the respective transformed image corresponding to a binary image;

wherein during step d), each acquired transformed image is analyzed to determine the one or more characteristic parameters;

wherein each acquired transformed image comprises a high-intensity zone, wherein each high-intensity zone is defined by the zones of the respective acquired image, which have intensities that are greater than or equal to a determined intensity threshold;

wherein each characteristic parameter is obtained from the respective high intensity zones of the respective acquired images and at least one characteristic parameter is, or is a function of, a width of the high-intensity zone and at least one other characteristic parameter is, or is a function of, a length of the high-intensity zone;

wherein the respective width of each high-intensity zone is defined by a maximal extension of the respective high-intensity zone in a direction perpendicular to the direction of relative advancement;

wherein each high-intensity zone comprises a main portion and one or more elongated portions extending from the main portion; and wherein the length of each high-intensity zone is defined as a maximal extension of the high-intensity zone in the direction of relative advancement from a center of gravity of the high-intensity zone, the length corresponding to a maximal extension of an elongated portion of the high-intensity zone that is farthest from the center of gravity.

15. The laser treatment machine of claim 14, wherein the laser treatment machine is further configured such that at least the elements c)-f) are repeated one or more times.

16. The laser treatment machine of claim 14, wherein the laser treatment machine is further configured such that at least the elements a)-f) are repeated one or more times.

17. The laser treatment machine of claim 14, wherein the laser treatment machine is further configured such that in element e), the statistical parameter is chosen from at least one of: a respective medium value, a respective variance, or a respective skewness of the probabilistic distribution.

18. The laser treatment machine of claim 14, wherein the direction of relative advancement being a movement of the laser beam relative to the work piece.

19. A laser treatment method of a metallic work piece comprising at least the steps of:

a) directing a laser beam onto the work piece at a working zone of the work piece in order to execute a cutting and/or piercing;

b) executing a relative movement between the laser beam and the work piece, the relative movement defining a direction of relative advancement, the direction of relative advancement being a direction of movement of the laser beam relative to the work piece;

c) acquiring a plurality of acquired images of the working zone;

d) transforming each acquired image into a respective transformed image by thresholding each acquired image to obtain the respective transformed image corresponding to a binary image;

e) analyzing each transformed image to determine characteristic parameters comprising a width and a length of a high-intensity zone in the transformed image, the high-intensity zone being defined by zones of the respective acquired image having intensities greater than or equal to a determined intensity threshold, the high-intensity zone comprising a main portion and one or more elongated portions extending from the main portion, the width being defined as a maximal extension of the high-intensity zone in a direction perpendicular to the direction of relative advancement, and the length being defined as a maximal extension of the high-intensity zone in the direction of relative advancement from a center of gravity of the high-intensity zone, the length corresponding to a maximal extension of an elongated portion of the high-intensity zone that is farthest from the center of gravity;

f) determining respective time courses of the characteristic parameters from the plurality of acquired images;

g) calculating at least one statistical parameter from the respective time course of each characteristic parameter;

h) establishing a quality value from the at least one statistical parameter; and i) controlling one or more process parameters in function of the quality value.

* * * * *